US010069684B2

(12) United States Patent
Kant et al.

(10) Patent No.: US 10,069,684 B2
(45) Date of Patent: Sep. 4, 2018

(54) CORE NETWORK ANALYTICS SYSTEM

(71) Applicant: Accenture Global Services Limited, Dublin (IE)

(72) Inventors: Mayank Kant, Bangalore (IN); Rajan Shingari, New Delhi (IN); Kaushik Sanyal, Bangalore (IN); Arnab D. Chakraborty, Bangalore (IN); Kumar Saurabh, Sitamarhi (IN); Saket Bhardawaj, West-Champaran (IN); Vinoth Venkataraman, Bangalore (IN); Vikas Kumar, Ghaziabad (IN); Juan Morlanes Montesinos, Madrid (ES); Fernando Rex Lopez, Madrid (ES)

(73) Assignee: Accenture Global Services Limited, Dublin (IE)

( * ) Notice: Subject to any disclaimer, the term of this patent is extended or adjusted under 35 U.S.C. 154(b) by 212 days.

(21) Appl. No.: 15/096,804

(22) Filed: Apr. 12, 2016

(65) Prior Publication Data
US 2017/0048109 A1 Feb. 16, 2017

(30) Foreign Application Priority Data

Aug. 14, 2015 (IN) .......................... 4242/CHE/2015
Oct. 14, 2015 (EP) ................................... 15380044

(51) Int. Cl.
| | | |
|---|---|---|
| *G06F 11/00* | (2006.01) | |
| *H04L 12/24* | (2006.01) | |
| *H04L 12/26* | (2006.01) | |

(52) U.S. Cl.
CPC ...... *H04L 41/0836* (2013.01); *H04L 41/0816* (2013.01); *H04L 41/145* (2013.01);
(Continued)

(58) Field of Classification Search
CPC combination set(s) only.
See application file for complete search history.

(56) References Cited

U.S. PATENT DOCUMENTS

| | | |
|---|---|---|
| 6,353,902 B1 | 3/2002 | Kulatunge et al. |
| 6,711,613 B1 | 3/2004 | Ewing et al. |
| (Continued) | | |

FOREIGN PATENT DOCUMENTS

| | | |
|---|---|---|
| EP | 2871803 | 5/2015 |
| EP | 2887578 | 6/2015 |

OTHER PUBLICATIONS

Harahap et al., "A Router-based Management System for Predication of Network Congestion," http://ieeexplore.ieee.org/xpl/login.jsp?tp=&arnumber=6823315&url=http%3A%2Fieeexplore.ieee.org%2Fxpls%2Fabs_all.jsp%3Farnumber%3D6823315, Mar. 14, 2014, 6 pages.

(Continued)

*Primary Examiner* — Amine Riad
(74) *Attorney, Agent, or Firm* — Harrity & Harrity, LLP

(57) ABSTRACT

A method may include determining first network data corresponding to a first time period, including alarm data and incident data collected by a set of network devices of a core network during the first time period. The method may include creating, based on the first network data, an incident prediction model. The method may include receiving second network data, associated with the core network, corresponding to a second time period. The second network data may include alarm data and incident data collected by a network device, of the set of network devices, during the second time period. The method may include generating, based on the second network data and the incident prediction model, an (Continued)

incident prediction that includes a prediction whether the network device will experience an incident during a third time period.

20 Claims, 10 Drawing Sheets

(52) U.S. Cl.
CPC ........ *H04L 41/147* (2013.01); *H04L 41/5025* (2013.01); *H04L 43/50* (2013.01)

(56) References Cited

U.S. PATENT DOCUMENTS

| | | |
|---|---|---|
| 2008/0250265 A1 | 10/2008 | Chang et al. |
| 2009/0185496 A1 | 7/2009 | Doverspike et al. |
| 2013/0155840 A1 | 6/2013 | Li et al. |
| 2013/0238534 A1 | 9/2013 | Nagaraj et al. |
| 2015/0135012 A1* | 5/2015 | Bhalla ................ H04L 41/147 714/26 |
| 2015/0195192 A1 | 7/2015 | Vasseur et al. |

OTHER PUBLICATIONS

Vidalenc et al., "Proactive Fault Management based on Risk-Augmented Routing," http://ieeexplore.ieee.org/xpl/login.jsp?tp=&arnumber=5700366&url=http%3A%2F%2Fieeexplore.ieee.org%2Fiel5%2F5687602%2F5700081%2F05700366.pdf%3Farnumber%3D5700366, Dec. 6, 2010, 5 pages.
Extended European Search Report corresponding to EP Application No. 15380044.6, dated Jun. 14, 2016, 9 pages.

* cited by examiner

CORE NETWORK ANALYTICS SYSTEM

RELATED APPLICATION(S)

This application claims priority to Indian Application No. 4242/CHE/2015 and European Application No. 15 380 044.6, filed on Aug. 14, 2015 and Oct. 14, 2015, respectively, the contents of which are incorporated by reference herein in their entirety.

BACKGROUND

A core network (sometimes referred to as a backbone network) is a portion of a communications network that may provide various services to customers connected via an access network. In some implementations, the core network may provide paths for the exchange of information between different access networks.

SUMMARY

According to some possible implementations, a method may include determining, by a device, first network data corresponding to a first time period, where the first network data may include information associated with alarms detected by a set of network devices, included in a core network, during the first time period, and where the first network data may include information associated with incidents experienced by the set of network devices during the first time period; creating, by the device and based on the first network data, rules for an incident prediction model associated with the core network; receiving, by the device, second network data, associated with the core network, corresponding to a second time period, where the second network data may include information associated with alarms detected by at least one network device, of the set of network devices, during the second time period, where the second network data may include information associated with incidents experienced by the at least one network device during the second time period, and where the second time period may be a time period after the first time period; generating, by the device and based on the second network data and the incident prediction model, an incident prediction that includes a prediction whether the at least one network device will experience an incident during a third time period; and providing, by the device, information associated with the incident prediction to cause an action to be performed in the core network.

According to some possible implementations, a computer-readable medium may store one or more instructions that, when executed by one or more processors, may cause the one or more processors to: determine historical network data associated with a network, where the historical network data may include information associated with alarms detected by a set of network devices, included in the network, during a first time period, and where the historical network data may include information associated with incidents experienced by the set of network devices during the first time period; train, based on the historical network data, an incident prediction model associated with the network; determine current network data, associated with the network, where the current network data may include information associated with alarms detected by a network device, of the set of network devices, during a second time period that follows the first time period, and where the current network data may include information associated with incidents experienced by the network device during the second time period; generate, based on the current network data and the incident prediction model, an incident prediction, where the incident prediction may include a prediction whether the network device will experience an incident during a future time period; and provide information associated with the incident prediction.

According to some possible implementations, a device may include one or more processors to: determine network data associated with a core network, where the network data may include information associated with alarms detected by a network device, of a set of network devices included in the core network, during a time period, and where the network data may include information associated with incidents experienced by the network device during the time period; select an incident prediction model, from a plurality of incident prediction models, associated with the core network; generate, based on the network data and the incident prediction model, an incident prediction, where the incident prediction may include a prediction of whether the network device will experience an incident during another time period, where the other time period may be later than the time period; and provide information associated with the incident prediction.

DETAILED DESCRIPTION

Figure 1A:
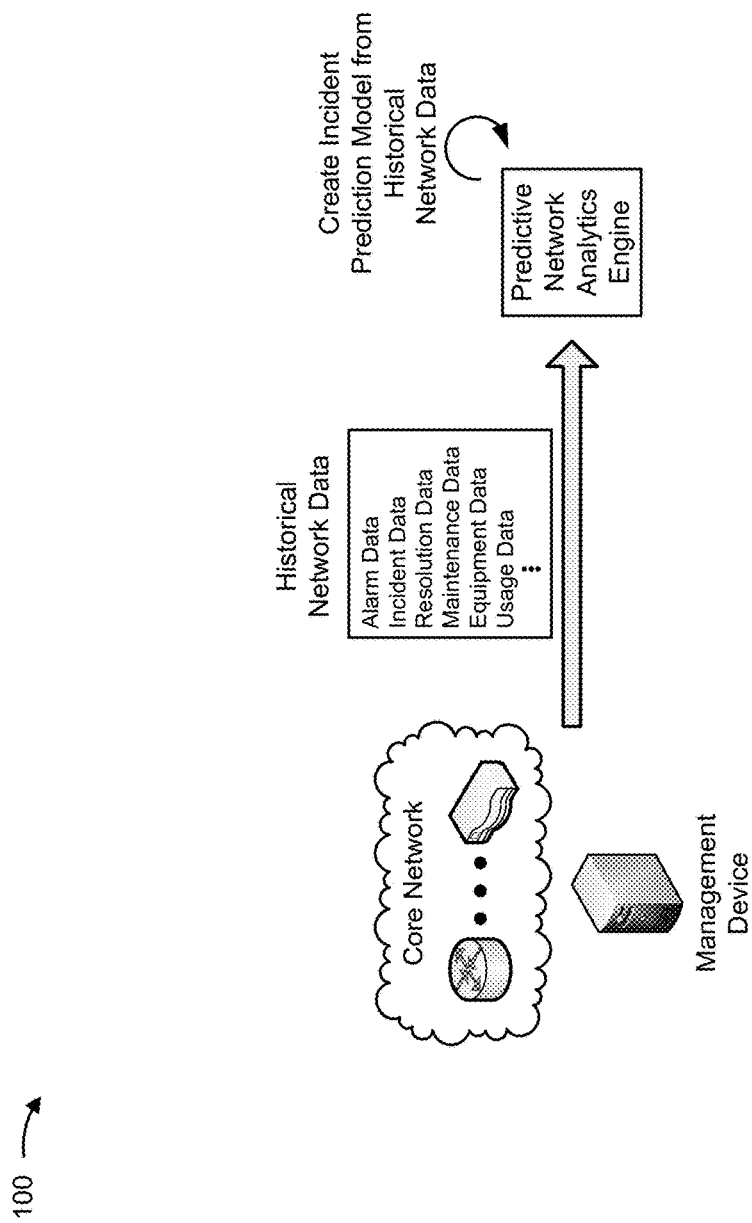
FIGS. 1A and 1B are diagrams of an overview of an example implementation described herein.

The following detailed description of example implementations refers to the accompanying drawings. The same reference numbers in different drawings may identify the same or similar elements.

A core network may need to grow in order to support increasing data traffic. Such growth may include physical growth (i.e., the addition of network devices to the core network) and/or logical growth (i.e., the addition of functionality to the network devices of the core network). As such, the size and complexity of a core network may be beyond the ability of a core network operator to predict and/or identify an incident, such as an incident causing a failure of a network device, an incident causing a need to repair a network device, an incident causing a need to reconfigure a network device, or the like. Moreover, a service provider (e.g., a wireline service provider, a cellular service provider, a cable service provider, a satellite service provider, etc.) may rely on the core network in order to provide reliable, high-speed communication for its customers. Consequently, an incident within the core network, however brief, may lead to significant consequences (e.g., revenue loss) for the service provider.

In some cases, the core network operator, associated with managing the core network, may perform reactive maintenance (e.g., resolve an incident after the incident has occurred) and/or may perform preventive maintenance that is not in response to any particular incident (e.g., at planned intervals of time, etc.). However, such reactive and/or preventative maintenance may not inform the core network operator as to why an incident has occurred and/or may occur, which may lead to an undesirable amount of resources (e.g., in personnel, in time, etc.) being consumed in order to resolve and/or diagnose later occurring incidents.

However, network devices and/or management devices (e.g., associated with managing the network devices within the core network) may be capable of determining and providing one or more types of network data associated with the core network. For example, the network devices and the management devices may determine and provide alarm data associated with an event detected by a network device, incident data associated with a network device, equipment data that describes a network device, maintenance data associated with a network device, usage data associated with a network device, resolution data associated with resolving an incident, or the like. Such network data may include trends that, if discerned, may help predict potential incidents before the incidents occur within the core network.

However, due to the size and/or complexity of the core network and/or the volume and/or state of the network data, the core network operator may be unable to accurately predict such incidents. For example, the core network may generate thousands of alarms, but a relatively low number of these alarms may precede incidents within the core network. As such, the core network operator may wish to have the capability to identify which alarms and/or sequences of alarms may lead to incidents within the core network so that the core network operator can perform a proactive remedial action before the incidents occur.

Implementations describe herein may allow an analytics device, associated with a core network, to process and analyze historical network data, associated with the core network, to create an incident prediction model associated with the core network. The analytics device may then generate, using the incident prediction model and additional network data, an incident prediction that predicts whether a future incident will occur within the core network. This allows a core network operator to perform a proactive remedial action before the incident occurs, thus preventing a potential failure associated with the core network.

In some cases, such incident prediction capability leads to improved key performance indicators (KPIs) associated with the core network, such as a remote resolution KPI, a technician productivity KPI, a contract compliance KPI, a customer experience KPI, an operational cost KPI, or the like.

Also, this incident prediction capability leads to improved network service for customers since, for example, the core network may have a lower incident rate (e.g., 20%-30% lower than without incident prediction), and/or since faulty network devices may be repaired and/or reconfigured before performance of the core network is affected. Further, this incident prediction capability helps avoid network black outs, improves adherence to service level agreements, lowers operational cost, and improves technician productivity (e.g., due to additional knowledge gleaned from an incident prediction).

Additionally, the predictive capability permits for efficient resource management for resources associated with managing the core network. For example, using incident predictions, the core network operator may be capable of identifying resources (e.g., parts, technicians, tools, etc.), forecasting repairs and/or part requirements, scheduling usage of available resources, or the like.

Figure 1B:
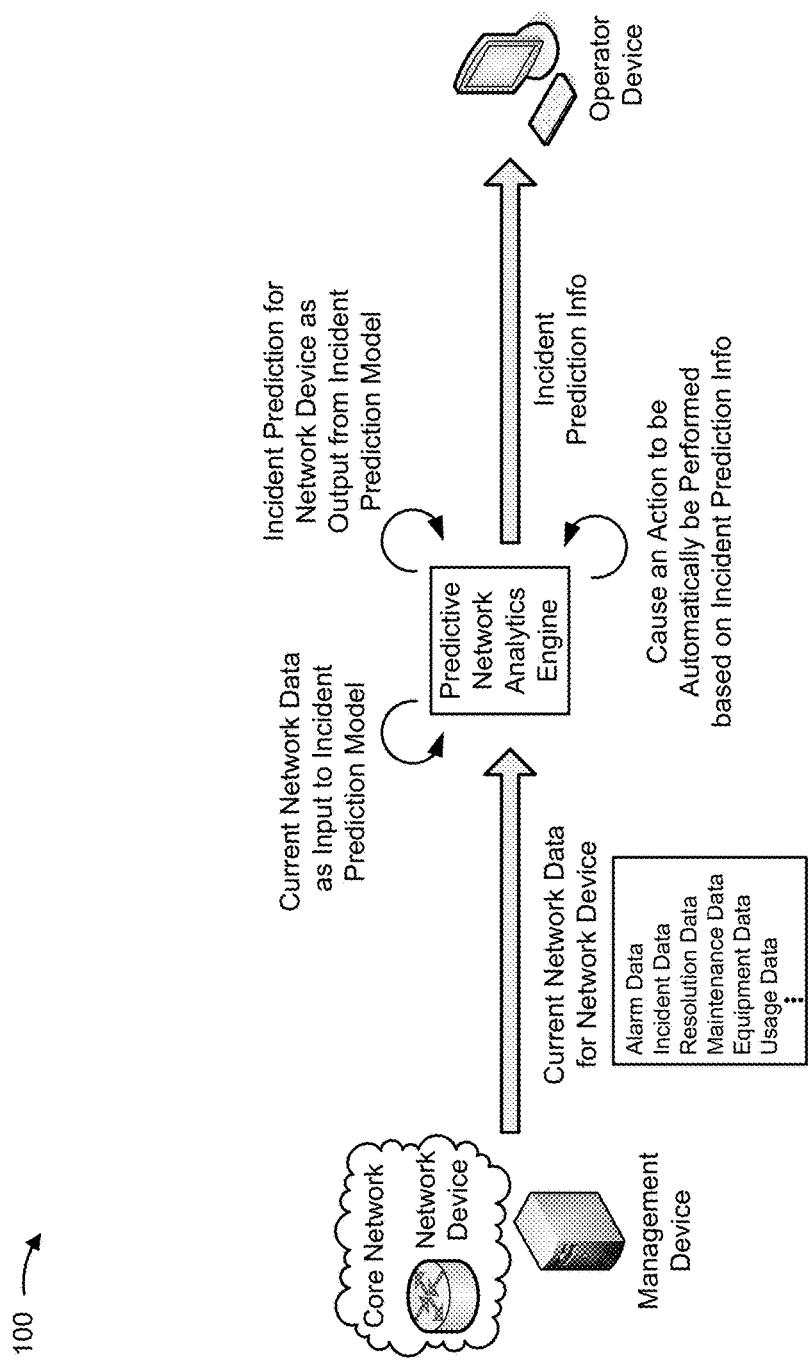

FIGS. 1A and 1B are diagrams of an overview of an example implementation 100 described herein. For the purposes of example implementation 100, assume that a core network includes a group of network devices, and that a management device is positioned to manage the network devices. Further, assume that the network devices and the management device are configured to collect, determine, and/or store network data associated with the network devices of the core network.

As shown in FIG. 1A, the group of network devices and the management device may provide, to a predictive network analytics engine (herein referred to as an analytics device), historical network data (e.g., network data corresponding to a period of time that has already passed) associated with the group of network devices. In some implementations, the historical network data may be used to create an incident prediction model for the core network. In some implementations, the historical network data may correspond to a period of time that includes one or more weeks, one or more months, one or more years, or the like. As shown, the historical network data may include alarm data associated with events detected by a network device, incident data associated with the failures within the core network, resolution data associated with resolving incidents within the core network, maintenance data associated with the group of network devices, equipment data associated with the network devices, usage data associated with the network devices, or the like.

As further shown in FIG. 1A, the analytics device may receive the historical network data. As shown, the analytics device may process and analyze the historical network data in order to create rules for the incident prediction model for the core network. In some implementations, the incident prediction model may include a model designed to receive, as an input, network data associated with the core network, and provide, as an output, a prediction as to whether an incident will occur within the core network. For example, the incident prediction model may be designed to receive additional (e.g., current) network data associated with one or more network devices, and provide output that predicts whether the one or more network devices will experience an incident (e.g., within a future time period). Here, the analytics device may store the incident prediction model (e.g., for later use).

For the purposes of FIG. 1B, assume that, at a later time, the analytics device has received an indication that the analytics device is to generate an incident prediction for a particular network device within the core network. As shown, the management device and the particular network device may, upon a request from the analytics device, provide additional (e.g., current) network data, associated with the particular network device, to the analytics device. For example, the particular network device and the analytics device may provide network data collected during a most recent 24 hour time period. As shown, the additional network data may also include alarm data, incident data, resolution data, maintenance data, equipment data, usage data, or the like.

As shown, the analytics device may process the additional network data and provide the processed additional network data as an input to the incident prediction model. As further shown, the analytics device may receive, as an output of the incident prediction model, an incident prediction associated with the particular network device. In some implementations, the incident prediction may include a prediction (e.g., a probability, a binary output, a yes-no output, a prediction score, etc.) as to whether the particular network device will experience an incident during an upcoming time window (e.g., a next 12 hours, a next 24 hours, a next two days, etc.).

As shown, in some implementations, the analytics device may cause a proactive remedial action to automatically be performed based on the information associated with the incident prediction. For example, the analytics device may cause the particular network device to be automatically reconfigured, restarted, powered-off, or the like.

As also shown, in some implementations, the analytics device may provide information associated with the incident prediction to another device, such as an operator device associated with the core network, the particular network device, the management device, or the like, in order to cause a proactive remedial action to be performed before the incident occurs (e.g., in order to prevent the incident from occurring).

In this way, an analytics device, associated with a core network, may process and analyze historical network data, associated with the core network, to create an incident prediction model associated with the core network. The analytics device may then generate, using the incident prediction model and additional (e.g., current) network data, an incident prediction that predicts whether a future incident will occur within the core network.

Figure 2:
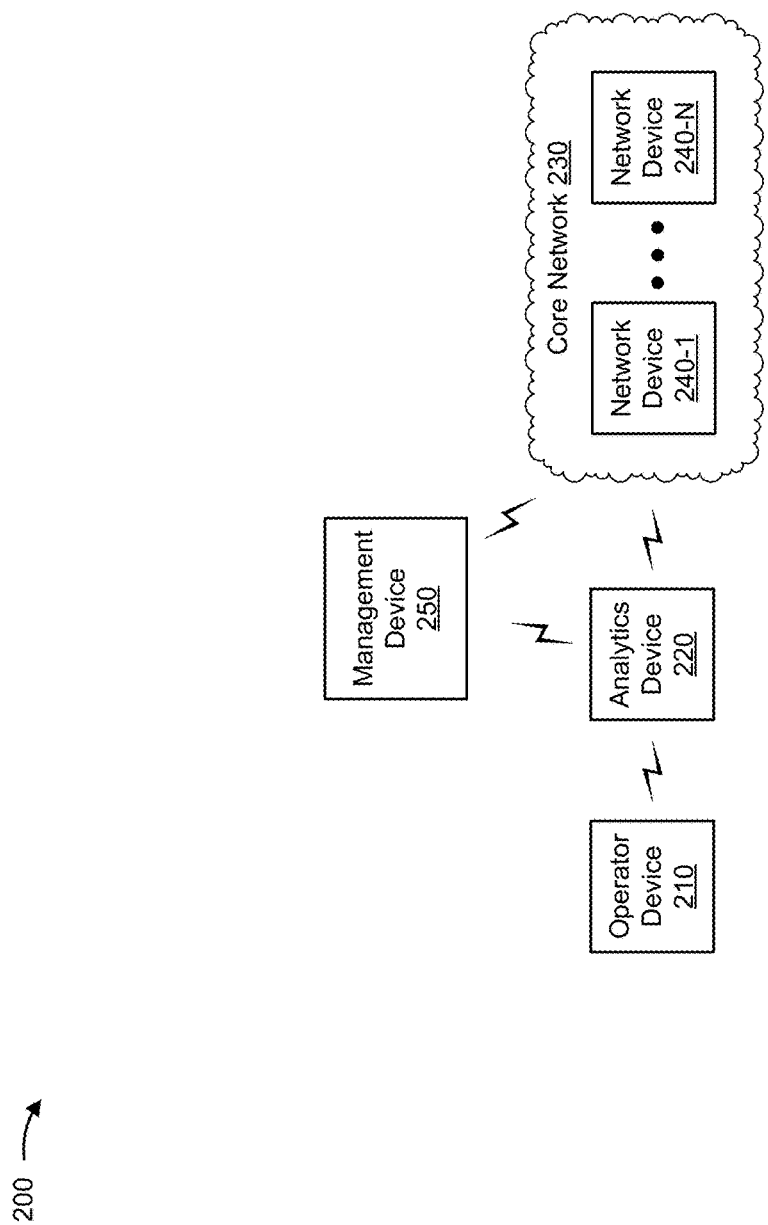
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an operator device 210, an analytics device 220, a core network 230 including one or more network devices 240-1 through 240-N (N≥1) (hereinafter referred to collectively as network devices 240, and individually as network device 240), and a management device 250. Devices of environment 200 may interconnect via wired connections, wireless connections, or a combination of wired and wireless connections.

Operator device 210 may include a device capable of receiving, determining, processing, storing, and/or providing information relating to an incident prediction associated with core network 230. For example, operator device 210 may include a desktop computer, a laptop computer, a mobile phone (e.g., a smart phone, a radiotelephone, etc.), a handheld computer, a wearable communication device (e.g., a smart wristwatch, a pair of smart eyeglasses, etc.), a server device, or a similar type of device. In some implementations, operator device 210 may be associated with a core network operator of core network 230, such as a device associated with monitoring core network 230.

Analytics device 220 may include a device associated with creating an incident prediction model associated with core network 230 and/or generating an incident prediction, associated with core network 230, using the incident prediction model. For example, analytics device 220 may include a computing device, such as a server or a group of servers. In some implementations, analytics device 220 may include one or more devices in a cloud computing environment.

Core network 230 may include a network that provides various services via one or more access networks connected to the core network. In some implementations, core network 230 may be referred to as a backbone network. For example, core network 230 may include an Internet Protocol (IP) network, a metropolitan area network (MAN), an Ethernet network, a transport network, or the like. In some implementations, core network 230 may include a group of network devices 240.

Network device 240 may include a network device included in core network 230. For example, network device 240 may include a router, a gateway, a switch, a hub, a bridge, a reverse proxy, a server (e.g., a proxy server), a firewall, a security device, an intrusion detection device, a load balancer, or a similar device.

Management device 250 may include a device associated with receiving, determining, storing, processing, and/or providing information associated with managing one or more network devices 240 included in core network 230. For example, management device 250 may include a computing device, such as a server or a group of servers.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
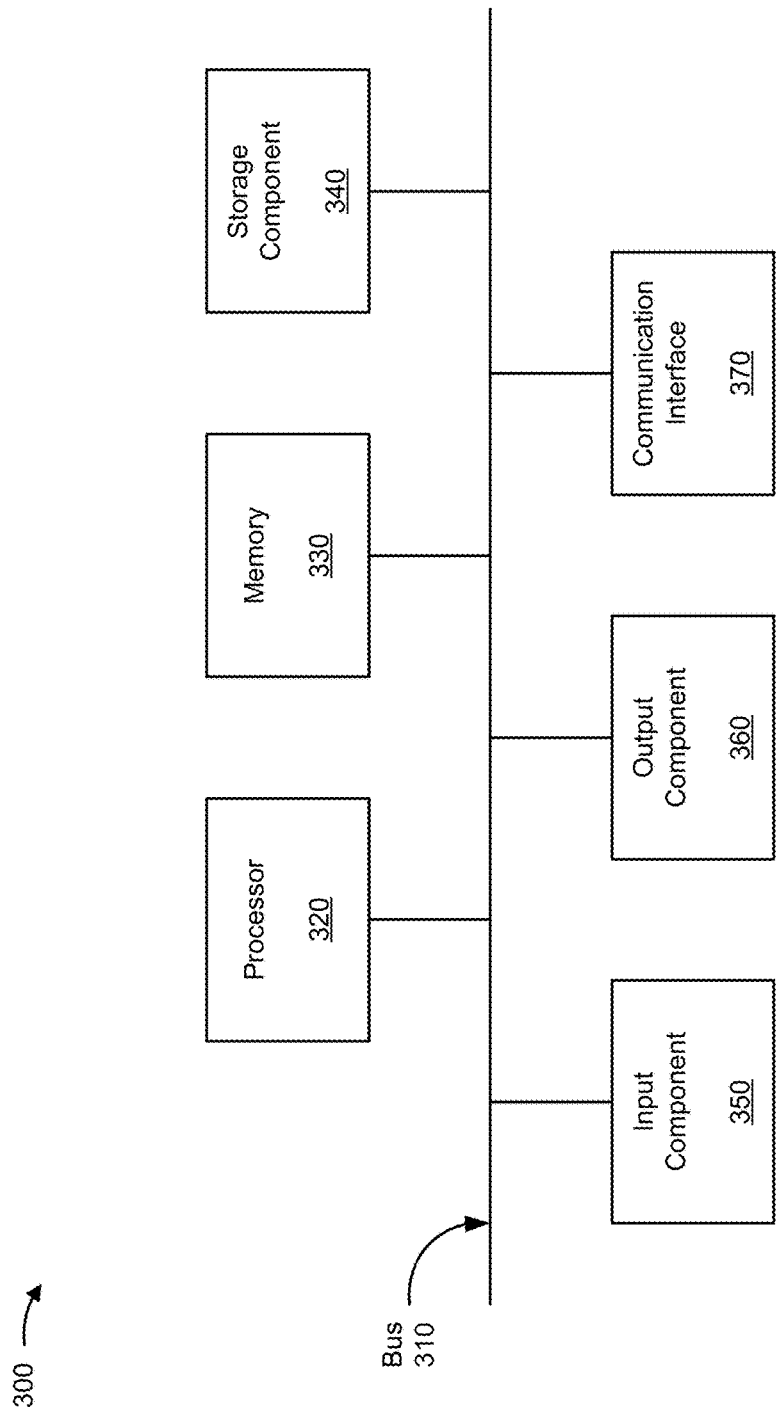
FIG. 3 is a diagram of example components of one or more devices of FIG. 2.

FIG. 3 is a diagram of example components of a device 300. Device 300 may correspond to operator device 210, analytics device 220, network device 240, and/or management device 250. In some implementations, operator device 210, analytics device 220, network device 240, and/or management device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space located inside of a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
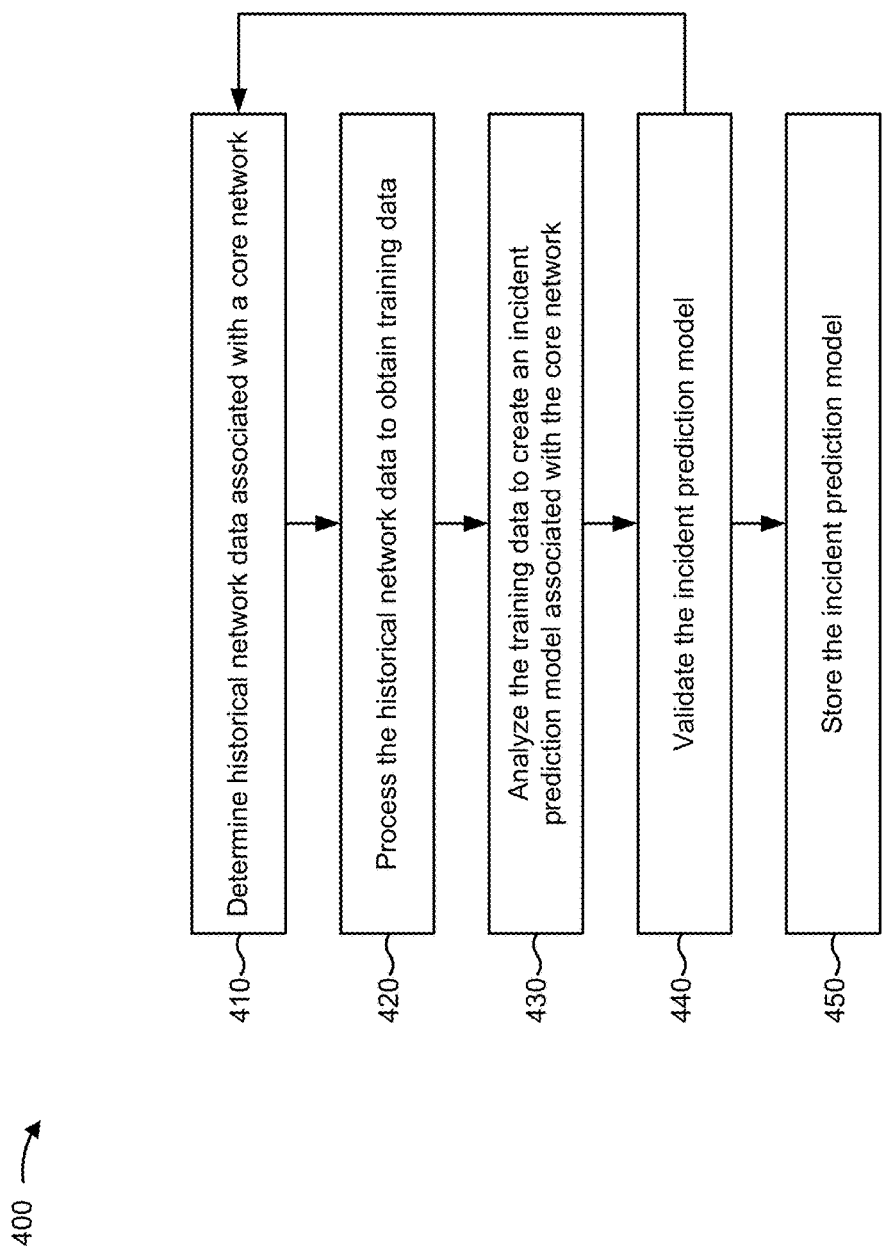
FIG. 4 is a flow chart of an example process for creating an incident prediction model, associated with a core network, based on historical network data associated with the core network.

FIG. 4 is a flow chart of an example process 400 for creating an incident prediction model, associated with a core network, based on historical network data associated with the core network. In some implementations, one or more process blocks of FIG. 4 may be performed by analytics device 220. In some implementations, one or more process blocks of FIG. 4 may be performed by another device or a group of devices separate from or including analytics device 220, such as operator device 210 and/or management device 250.

As shown in FIG. 4, process 400 may include collecting historical network data associated with a core network (block 410). For example, analytics device 220 may collect historical network data associated with core network 230. In some implementations, analytics device 220 may collect the historical network data when network devices 240 and/or management devices 250, associated with core network 230, provide the historical network data.

The historical network data may include network data, associated with the core network 230, that may be used to create an incident prediction model associated with core network 230. In some implementations, the historical network data may correspond to a particular period of time, such as a one week period of time, a five month period of time, a one year period of time, or the like. In some implementations, the time period associated with the historical network data may be referred to as a first time period.

In some implementations, the historical network data may include alarm data associated with one of more network devices 240. The alarm data may include information associated with an alarm detected by network device 240. An alarm may include a type of event that causes alarm data to be generated (e.g., network device 240 may be configured to generate alarm data after detecting particular events). In some implementations, the events that cause the alarm data to be generated (i.e., alarms) may be a proper subset of all events. For example, network device 240 may be configured to detect an alarm when network device 240 is unable to communicate with a neighboring network device 240, when network device 240 detects that a port of network device 240 is experiencing a service issue, when an amount of memory used by network device 240 satisfies a threshold, when an amount of processing resources used by network device 240 satisfies a threshold, when a throughput of network device 240 satisfies a threshold, or the like. In some implementations, the alarm data may be provided by network devices 240 in accordance with a particular standard, such as simple network management protocol (SNMP), syslog, or the like. In some implementations, the alarm data may be referred to as information associated with alarms detected by network device(s) 240.

Additionally, or alternatively, the alarm data may include information associated with the alarm, such as information that identifies network device 240 associated with the alarm, information that identifies an event corresponding to the alarm, information indicating whether the alarm is a first occurrence of the alarm, information indicating an alarm count associated with the alarm (e.g., when network device 240 detects the same alarm multiple times), information that identifies an alarm category and/or classification, a reason and/or a cause of the alarm, information that indicates a severity of the alarm (e.g., low, moderate, high, based on numerical scale, etc.), an owner and/or operator of network device 240, a type of network associated with the alarm (e.g., MAN, IP, Ethernet, etc.), and/or another type of information associated with the alarm. In some implementations, network devices 240 may detect multiple (e.g., hundreds, thousands, etc.) of alarms during a given time period. In some implementations, one or more alarms may precede an occurrence of an incident (e.g., a failure associated with network device 240, a need to repair network device 240, a need to reconfigure network device 240, etc.). For example, network device 240 may detect a sequence of alarms with increasing severity, whereby the last alarm in the sequence may result in an incident associated with network device 240. In some implementations, the alarm data may include information associated with the alarm sequence, such as information associated with a first alarm of the sequence (e.g., a timestamp, an alarm type, etc.), information associated with a last alarm of the alarm sequence, or the like.

Additionally, or alternatively, the historical network data may include incident data associated with core network 230. The incident data may include data associated with an event, detected by network device 240, that is to be resolved by a technician, remotely via management device 250, or the like. In some implementations, an incident may include an event that needs resolution and/or that may be associated with a failure of network device 240 (e.g., rather than alarm which may not require resolution and/or may not cause a failure). For example, the incident may include an event that results in a bottleneck associated with a data flow within core network 230, an outage of core network 230, a failure of network device 240, or the like. In some implementations, one or more alarms and/or alarm sequences (e.g., groups of related alarms) may precede the incident. In some implementations, the incident data may include information associated with the incident, such as an incident identifier, a reason and/or a cause associated with the incident, a timestamp associated with the incident, a status associated with the incident, a network type associated with the incident (e.g., MAN, IP, Ethernet, etc.), or the like. In some implementations, network device 240 and/or management device 250 may detect the incident and determine the incident data. Additionally, or alternatively, the incident data may be manually reported (e.g., by a technician, by a core network administrator, etc.). In some implementations, the incident data may be referred to as information associated with incidents experienced by network device(s) 240.

Additionally, or alternatively, the historical network data may include maintenance data associated with the core network 230. The maintenance data may include information corresponding to scheduled work associated with the repairing, reconfiguring, adjusting, maintaining, or the like, network devices 240 of core network 230. For example, the maintenance data may include information associated with maintenance that has been performed and/or that is scheduled to be performed on network device 240. In some implementations, the maintenance data may include information associated with maintenance to be performed within core network 230, such as a type of maintenance, a network device 240 identifier upon which the maintenance is to be performed, a status of the maintenance performance, or the like.

Additionally, or alternatively, the historical network data may include equipment data associated with core network 230. The equipment data may include characteristics of network devices 240. For example, the equipment data may include a network device 240 identifier, a type of network device 240, a configuration of network device 240 a capability of network device 240, a manufacturer of network device 240, a network type associated with network device 240 (e.g., MAN, IP, Ethernet, etc.), a geographic location of network device 240, a topology of core network 230, or the like.

Additionally, or alternatively, the historical network data may include usage data associated with the core network 230. The usage data may include performance information associated with network devices 240 of core network 230. For example, the usage data may include memory utilization of network device 240, processor utilization of network device 240, a throughput of network device 240, an amount of power consumption of network device 240, or the like.

Additionally, or alternatively, the historical network data may include resolution data associated with network device 240. The resolution data may include information associated with resolving an incident. For example, the resolution data may include information that identifies network device 240 for which a resolution was attempted, information that identifies an incident that caused the resolution attempt, information indicating a manner in which network device 240 was repaired and/or reconfigured to prevent an incident and/or resolve an incident, information indicating whether the incident resolution was successful, a timestamp associated with the resolution, or the like.

In some implementations, analytics device 220 may receive the historical network data from network devices 240 of core network 230. For example, network devices 240 may gather, determine, collect, and/or store the historical network data (e.g., alarm data, incident data, equipment data, usage data, etc.), and may store the historical network data and/or provide the historical network data (e.g., periodically over a period of time, at an end of the period of time, based on a request, etc.) to analytics device 220. Additionally, or alternatively, analytics device 220 may receive the historical network data from management device 250. For example, management device 250 may store of have access to maintenance data, associated with network devices 240, and/or resolution data associated with network devices 240, and may provide (e.g., periodically over a period of time, at an end of the period of time, based on a request, etc.) the historical network data to analytics device 220.

As further shown in FIG. 4, process 400 may include processing the historical network data to obtain training data (block 420). For example, analytics device 220 may process the historical network data to put the data into a format that may be analyzed to create an incident prediction model (herein referred to as training data). In some implementations, analytics device 220 may process the historical network data to obtain the training data when analytics device 220 receives the historical network data. Additionally, or alternatively, analytics device 220 may process the historical network data to obtain the training data when analytics device 220 receives an indication that analytics device 220 is to process the historical network data from a user of analytics device 220, such as when analytics device 220 receives an indication to create an incident prediction model for a period of time corresponding to the historical network data.

In some implementations, analytics device 220 may process the historical network data by cleansing the historical network data. For example, analytics device 220 may cleanse the alarm data included in the historical network data. In some implementations, for example, analytics device 220 may cleanse the alarm data by converting the alarm data, such as SNMP formatted alarm data, to a particular format, such as a flat text format for use in further processing. As another example, analytics device 220 may cleanse the alarm data by removing unneeded alarm data, such as removing one or more portions of the alarm data (e.g., fields in a table of alarm data) that are not relevant to creating the incident prediction model. As another example, analytics device 220 may cleanse the alarm data by removing repetitive historical network data, such as incremental alarm data that does not represent a last alarm in an alarm sequence (e.g., when the last alarm in the alarm sequence includes the repetitive information). As another example, analytics device 220 may cleanse the alarm data by translating the alarm data (e.g., from Spanish to English), removing special characters and/or strings of characters from the alarm data (e.g., semi-colons, exclamation points, "the", etc.).

As another example, analytics device 220 may cleanse the incident data included in the historical network data. In some implementations, for example, analytics device 220 may cleanse the incident data by removing duplicate incident data (e.g., when the same incident is detected by network device 240 and management device 250). As another example, analytics device 220 may cleanse the incident data by removing incident data for incidents that have been resolved, incidents that are not generated by network device 240 (i.e., such that manually generated incidents are removed from the incident data). As still another example, analytics device 220 may cleanse the incident data by filtering incident data based on a reason and/or a cause associated with the incidents. As yet another example, analytics device 220 may cleanse the incident data by translating the incident data.

While the above examples are described in the context of processing the historical network data by cleansing alarm data and/or incident data, in some implementations, analytics device 220 may cleanse the other types of historical network data in a manner similar to that described above.

In some implementations, analytics device 220 may further process the historical network data by integrating the historical network data. Integrating the historical network data may include, for example, joining, merging, aggregating, correlating, and/or otherwise combining a first portion of the historical network data with a second portion of the historical network data. For example, analytics device 220 may integrate the historical network data by joining the alarm data and the incident data (e.g., such that associations between incidents and one or more alarms may be identified). As another example, analytics device 220 may integrate the historical network data by merging the equipment data and the joined alarm/incident data (e.g., such that associations between the equipment data and the alarm/incident data may be identified). As yet another example, analytics device 220 may integrate the historical network data by joining the maintenance data and the equipment/alarm/incident data (e.g., such that associations between the maintenance data and the equipment/alarm/incident data may be identified). Additionally, or alternatively, analytics device 220 may integrate the historical network data by joining, merging, aggregating, correlating, and/or otherwise combining two or more other portions of the historical network data.

In some implementations, integrating the historical network data may allow an association between data of a first type and data of a second type to be identified. For example, analytics device 220 may join the alarm data and the incident data such that analytics device 220 may map one or more alarms, associated with network device 240, to an incident detected by network device 240. As another example, merging the equipment data with the joined alarm/incident data may allow analytics device 220 to map characteristics of network device 240 (e.g., a network device type, a type of network, etc.) to the alarm/incident data. As still another example, joining the maintenance data and the merged equipment/alarm/incident data may allow analytics device 220 to map maintenance activities on network devices 240 to alarms and/or incidents.

Additionally, or alternatively, analytics device 220 may process the historical network data by deriving a core network variable based on the integrated and/or cleansed historical network data. A core network variable may include a performance metric, associated with network device 240 and derived based on the integrated and/or cleansed historical network data, that may be analyzed to create an incident prediction model. For example, the core network variable may include a hardware utilization variable associated with network device 240, such as a memory usage variable that describes an amount of memory (e.g., a minimum, a maximum, an average, a standard deviation, etc.) used by network device 240 over a period of time (e.g., a six hour period, a 12 hour period, a two day period, etc.), a processor usage variable that describes an amount of processing resources used by network device 240 over the period of time, or the like.

As another example, the core network variable may include a network device availability variable, associated with network device 240, that describes an amount of time (e.g., hours and minutes, a percentage of time, etc.) during a particular period of time (e.g., six hours, 12 hours, 48 hours, three days, etc.) that network device 240 was operational (i.e., did not experience any incidents).

As an additional example, the core network variable may include an incident window variable, associated with network device 240, that indicates a quantity of incidents detected during a time window, such as a three hour time window, a six hour time window, a 12 hour time window, a 24 hour time window, a two day time window, or the like. In some implementations, the time window associated with the incident window variable may correspond to a time window described by one or more alarms detected by network device 240 (e.g., a time window between a first alarm and a last alarm in an alarm sequence).

As yet another example, the core network variable may include an alarm window variable, associated with network device 240, that describes a quantity of alarms detected during a time window, such as a three hour time window, a six hour time window, a 12 hour time window, a 24 hour time window, a two day time window, or the like.

As still another example, the core network variable may include an alarm block variable and/or an alarm segment variable. Each alarm block variable may include information associated with a group of alarm sequences that start during a period of time, such as a 24 hour time window. Here each alarm sequence that starts during the period of time may be included in an alarm block. In this example, each alarm sequence, of the group of alarm sequences, may correspond to an alarm segment, where each alarm segment may extend beyond the period of time corresponding to the alarm block.

As another example, the core network variable may include an alarm consolidation variable that includes information associated with multiple alarms and/or alarm sequences that are consolidated into a single alarm sequence.

As an additional example, the core network variable may include an alarm reason variable that describes a reason for an alarm. In some implementations, the alarm reason variable may be derived by applying a pattern recognition technique to information associated with multiple alarms to identify one or more strings of characters (i.e., words, phrases, codes, etc.) that identify reasons for each of the multiple alarms. The reasons for each of the alarms may then be sorted, based on similarities between the reasons for the alarms, into a group of clusters. Each of the group of clusters may then be named, based on the alarm reasons included in the cluster. In this way, a large quantity of alarms (e.g., one hundred thousand, one million, one hundred million, etc.) may be organized into a relatively smaller set of clusters (e.g., 20 clusters, 50 clusters, 100 clusters, etc.) based on alarm reasons associated with the alarms.

In some implementations, analytics device 220 may obtain the training data as a result of processing the historical data in the manner described above (e.g., cleansing the historical network data, integrating the historical network data, deriving core network variables based on the historical network data). Analytics device 220 may analyze the training data in order to create rules for one or more incident prediction models, as described below.

In some implementations, analytics device 220 may perform one or more other types of processes on the historical network data to obtain the training data, such as by filtering the historical network data (e.g., based on a network type, based on a geographical location), normalizing the historical network data (e.g., such that a unit of measurement of the historical network data is consistent, etc.), or the like.

As further shown in FIG. 4, process 400 may include analyzing the training data to create an incident prediction model associated with the core network (block 430). For example, analytics device 220 may use machine learning techniques to analyze the training data to create an incident prediction model associated with core network 230. In some implementations, creating the incident prediction model (e.g., based on the training data obtained from the historical network data) may be referred to as training the incident prediction model. The machine learning techniques may include, for example, supervised and/or unsupervised techniques, such as decision trees, logistic regressions, artificial neural networks, Bayesian statistics, learning automata, Hidden Markov Modeling, linear classifiers, quadratic classifiers, association rule learning, or the like. The incident prediction model may include a model that is specific to a particular core network 230, a particular set of network devices 240 within core network 230, or the like. Additionally, or alternatively, the incident prediction model may be specific to a particular type of network (e.g., MAN, IP, Ethernet, etc.). In some implementations, analytics device 220 may create one or more incident prediction models for core network 230 and/or a particular set of network devices 240.

In some implementations, when analyzing the training data, analytics device 220 may perform one or more other operations, such as removing outliers from the training data, oversampling the training data (e.g., to remove bias toward predicting that an incident will not occur), partitioning the training data (e.g., such that a portion of the training data may be used to test the incident prediction model), reducing anomalies in the training data (e.g., to remove variables that are highly correlated to one another), or the like.

Additionally, or alternatively, analytics device 220, when analyzing the training data, may identify one or more core network variables as predictor variables that may be used to make the incident prediction. In some implementations, the predictor variables may represent inputs to the incident prediction model. For example, analytics device 220 may identify a subset (e.g., a proper subset) of the core network variables, derived in the manner described above, as predictor variables that may be used to accurately predict an incident. In some implementations, the predictor variables may include one or more of the core network variables that have a significant impact (e.g., an impact satisfying a threshold) on a probability of an incident as determined by analytics device 220. For example, if analytics device 220 determines that ninety percent of incidents of a particular type are associated with a particular core network variable satisfying a threshold (e.g., alarm intensity greater than 50 alarms per hour), then analytics device 220 may identify the particular core network variable as a predictor variable (e.g., since more than 50 alarms per hour occurred prior to ninety percent of incidents of the incident type). Alternatively, if analytics device 220 determines that there is no correlation or a weak correlation between incidents of the particular type and another particular core network variable (e.g., maximum memory consumed in the last 12 hours), then analytics device 220 may not identify the particular core network variable as a predictor variable.

In some implementations, the incident prediction model, created by analytics device 220, may be designed to receive, as an input, processed network data associated with one or more network devices 240, and provide, as an output, a prediction as to whether the one or more network devices 240 will experience an incident within a period of time (e.g., a next two hours, a next 24 hours, a next three days, etc.). For example, the incident prediction model may be designed to receive, as an input, one or more core network variables, identified as predictor variables and associated with network device 240, and provide, as an output, a prediction (e.g., a probability, a binary output, a yes-no output, a prediction score, etc.) that network device 240 will experience an incident in the next 24 hours.

As further shown in FIG. 4, process 400 may include validating the incident prediction model (block 440). For example, analytics device 220 may validate the incident prediction model. In some implementations, analytics device 220 may validate the incident prediction model after analytics device 220 creates the incident prediction model.

In some implementations, analytics device 220 may validate the incident prediction model based on a portion of the training data to be used for validation. For example, analytics device 220 may partition the training data into a first portion and a second portion, where the first portion may be used to create the incident prediction model, as described above. In this example, the second portion of the training data (herein referred to as validation data) may be used to validate the incident prediction model.

In some implementations, analytics device 220 may validate the incident prediction model by providing validation data, associated with one or more actual incidents, as input to the incident prediction model, and determining, based on an output of the incident prediction model, whether the incident prediction model correctly, or incorrectly, predicted the one or more actual incidents. In some implementations, analytics device 220 may validate the incident prediction model based on a validation threshold. For example, analytics device 220 may be configured to validate the incident prediction model when an amount of incidents, identified by the validation data, are correctly predicted by the incident prediction model (e.g., when the incident prediction model correctly predicts 50% of the incidents, 70% of the incidents, a threshold quantity of the incidents, etc.).

In some implementations, if analytics device 220 does not validate the incident prediction model (e.g., when a percentage of correctly predicted incidents does not satisfy the validation threshold), then analytics device 220 may return to block 410 and repeat process 400 in order to create additional incident prediction models.

Further, once the incident prediction model has been validated, analytics device 220 may further train the incident prediction model and/or create new incident prediction models based on receiving new training data. The new training data may include, in addition to the training data discussed above in relation to the historical network data, data from network devices 240 and/or management devices 250 associated with managing network devices 240. This data may include information relating to actions taken in particular situations in response to a predicted incident. For example, assume that analytics device 220 predicts that a particular network device 240 will experience an incident based on later received network data. Assume that a proactive remedial action was taken prior to the incident occurring and that, despite the proactive remedial action, network device 240 detected the predicted incident. In this situation, analytics device 220 may update one or more incident prediction models based on this information.

As further shown in FIG. 4, process 400 may include storing the incident prediction model (block 450). For example, analytics device 220 may store the incident prediction model in a data structure (e.g., a database, a linked list, a tree, or the like). The data structure may be located within analytics device 220 or external, and possibly remote from, analytics device 220.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
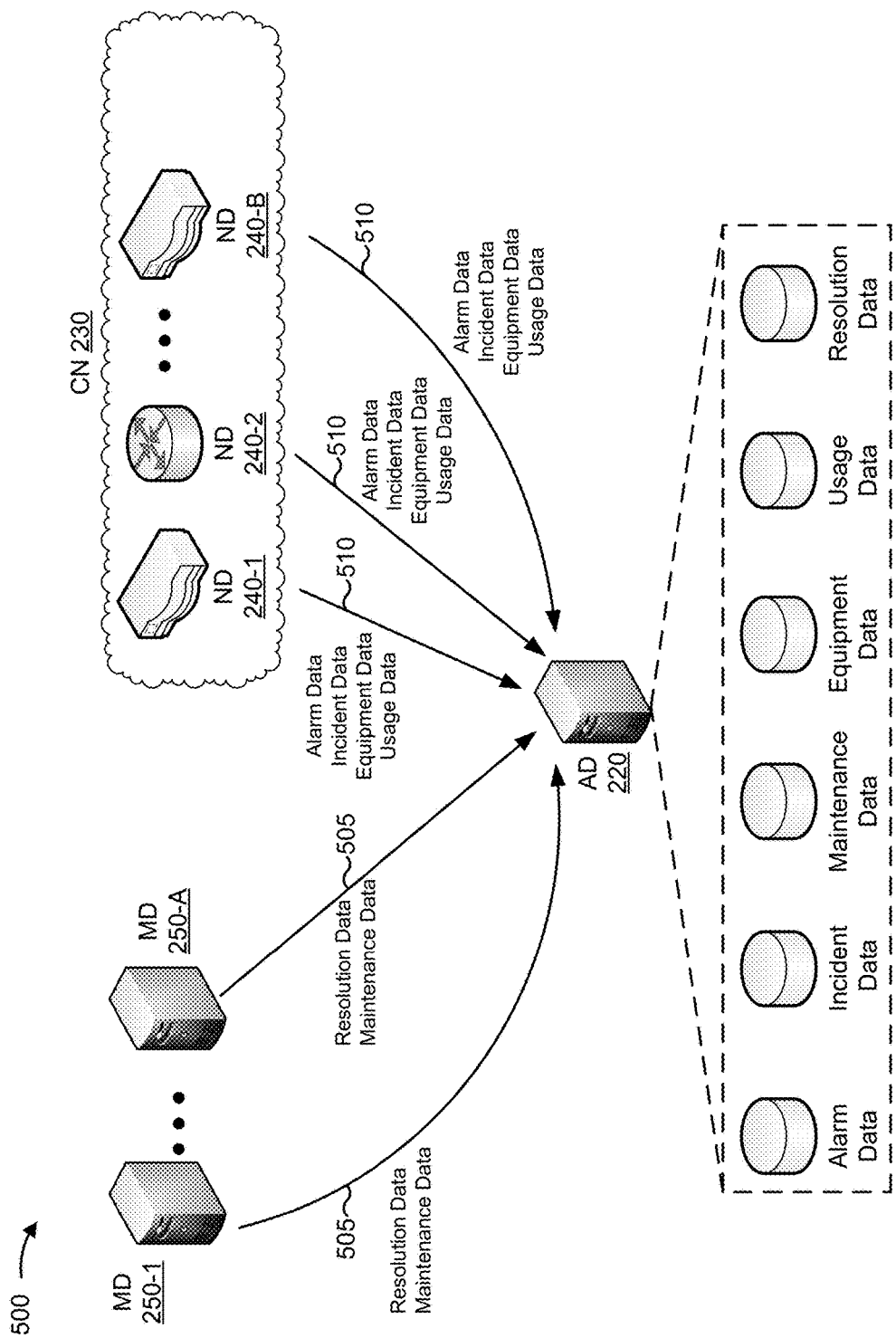
FIGS. 5A-5C are diagrams of an example implementation relating to the example process shown in FIG. 4.
Figure 5B:
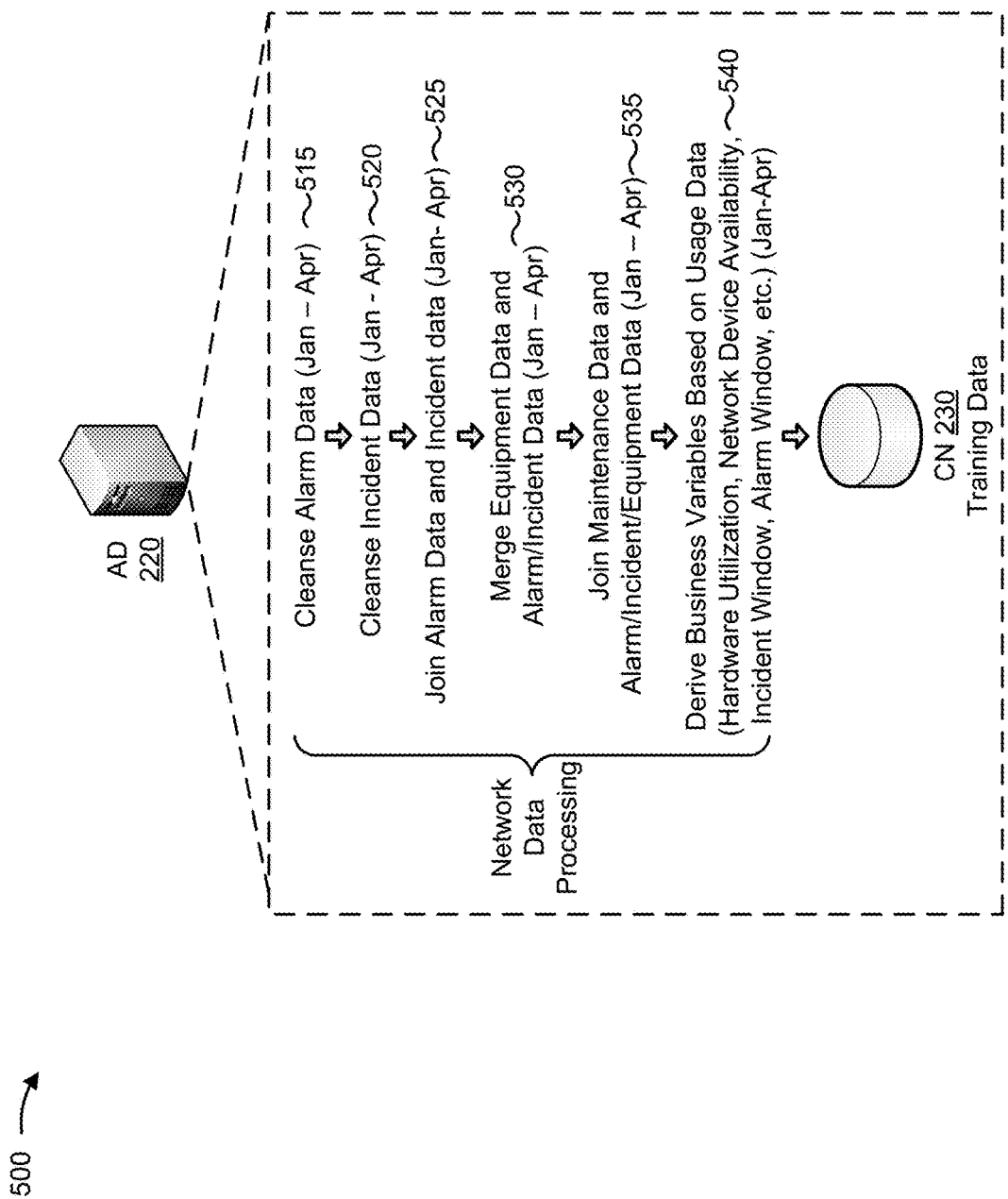
Figure 5C:
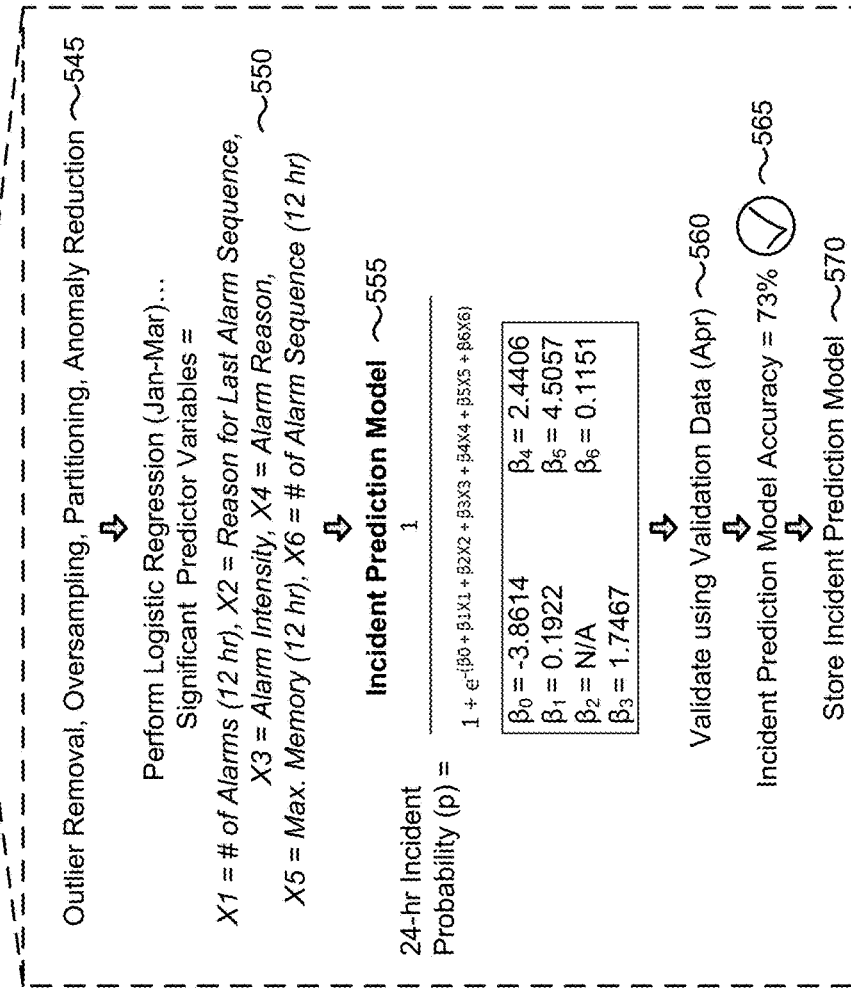

FIGS. 5A-5C are diagrams of an example implementation 500 relating to example process 400 shown in FIG. 4. For the purposes of example implementation 500, assume that core network 230 includes a group of network devices 240 (e.g., network device 240-1 through 240-B), and each network device 240 is configured to collect, determine, and/or gather network data, such as alarm data, incident data, equipment data, and usage data. Further, assume that a group of management devices 250 (e.g., management device 250-1 through management device 250-A), is also configured to collect, determine, and/or store network data, such as a resolution data and maintenance data associated with the group of network devices 240. Finally, assume that analytics device 220 has received an indication to create an incident prediction model based on historical network data (e.g., for a period of time covering January through April) provided by the group of network devices 240 and the group of management devices 250 (e.g., such that analytics device 220 may use the incident prediction model to predict future incidents within core network 230).

As shown in FIG. 5A, and by reference number 505, the group of management devices 250 may provide (e.g., based on a request from analytics device 220 for the purposes of creating the incident prediction model) historical network data corresponding to the period of time (i.e., the group of management devices 250 may provide historical network data that was collected during the period of time). For example, as shown, the group of management devices 250 may provide resolution data and maintenance data, associated with core network 230, collected during the period of time. Similarly, as shown by reference number 510, the group of network devices may also provide historical network data corresponding to the particular period of time. For example, as shown, the group of network devices 240 may provide alarm data, incident data, equipment data, and usage data collected and/or associated with the period of time. As further shown, analytics device 220 may receive the historical network data from the group of management devices 250 and the group of network devices 240, and may store the historical network data.

As shown in FIG. 5B, analytics device 220 may process the historical network data in order to obtain training data for use in creating the incident prediction model. For example, as shown by reference numbers 515 and 520, analytics device 220 may cleanse the alarm data, associated with the group of network devices 240 and corresponding to the period of time, and the incident data associated with the group of network devices 240 and corresponding to the period of time, respectively. As shown by reference number 525, analytics device 220 may then join the alarm data and the incident data. As shown by reference number 530, analytics device 220 may merge the equipment data, associated with the group of network devices 240 and corresponding to the period of time, with the joined alarm/incident data. As shown by reference number 535, analytics device 220 may join the maintenance data, associated with the group of network devices 240 and corresponding to the period of time, with the merged maintenance/alarm/incident data.

As shown by reference number 540, analytics device 220 may then derive a set of core network variables based on the usage data. For example, analytics device 220 may join the usage data with the equipment/maintenance/alarm/incident data, and may determine a set of core network variables that includes a hardware utilization variable, a network device availability variable, an incident window variable, an alarm window variable, or the like. As further shown, a result of processing the historical network data in the manner described above may be referred to as training data associated with core network 230, and analytics device 220 may store the training data accordingly. In some implementations, the set of core network variables may be referred to as a set of variables.

As shown in FIG. 5C, after processing the historical network data to obtain the training data, analytics device 220 may analyze the training data in order to create rules for the incident prediction model. For example, as shown by reference number 545, analytics device 220 may perform outlier removal, oversampling, anomaly reduction, and data partitioning. For the purposes of example implementation 500, assume that analytics device 220 partitions the training data into two portions: first training data that corresponds to a first portion of the period of time (e.g., January through March), and second training data that correspond to a second portion of the period of time (e.g., April) (herein referred to as validation data). Here, analytics device 220 may use the first training data to create the incident prediction model, and may use the validation data to validate the incident prediction model, as described below.

As shown by reference number 550, analytics device 220 may analyze the first training data, and may identify a set of core network variables, included in the first training data, as predictor variables that may be used in the incident prediction model. For example, using one or more machine learning techniques, analytics device 220 may identify a number of alarms per twelve hours variable, a reason for a last alarm sequence variable, an alarm intensity variable (e.g., number of alarms per hour), an alarm reason variable, a maximum amount of memory usage per twelve hours variable, and a number of alarm sequences per six hours variable as predictor variables.

As shown by reference number 555, analytics device 220 may apply a logistic regression technique, based on the first training data associated with the predictor variables to create the incident prediction model. As shown, the incident prediction model may be designed to predict whether network device 240, included in core network 230, will experience an incident in an upcoming 24 hour period, and may be described by the following equation:

$$\frac{1}{1+e^{-(\beta_0+\beta_1 X1+\beta_2 X2+\beta_3 X3+\beta_4 X4+\beta_5 X5+\beta_6 X6)}},$$

where X1 through X6 represent the predictor variables to be provided as inputs to the incident prediction model, and where $\beta_0$ through $\beta_6$ represent coefficients determined based on the logistic regression technique.

As shown by reference number 560, after creating the incident prediction model, analytics device 220 may validate the incident prediction model using the validation data. For example, analytics device 220 may use the validation data to determine an accuracy of the incident prediction model when predicting incidents experienced by network devices 240. As shown by reference number 565, analytics device 220 may determine that the incident prediction model has an acceptable accuracy rating of 73% (i.e., that the incident prediction model accurately predicted 73% of the incidents included in the second training data), thus validating the incident prediction model. As shown by reference number 570, analytics device 220 may then store the incident prediction model (e.g., for later use).

As indicated above, FIGS. 5A-5C are provided merely as examples. Other examples are possible and may differ from what was described with regard to FIGS. 5A-5C.

Figure 6:
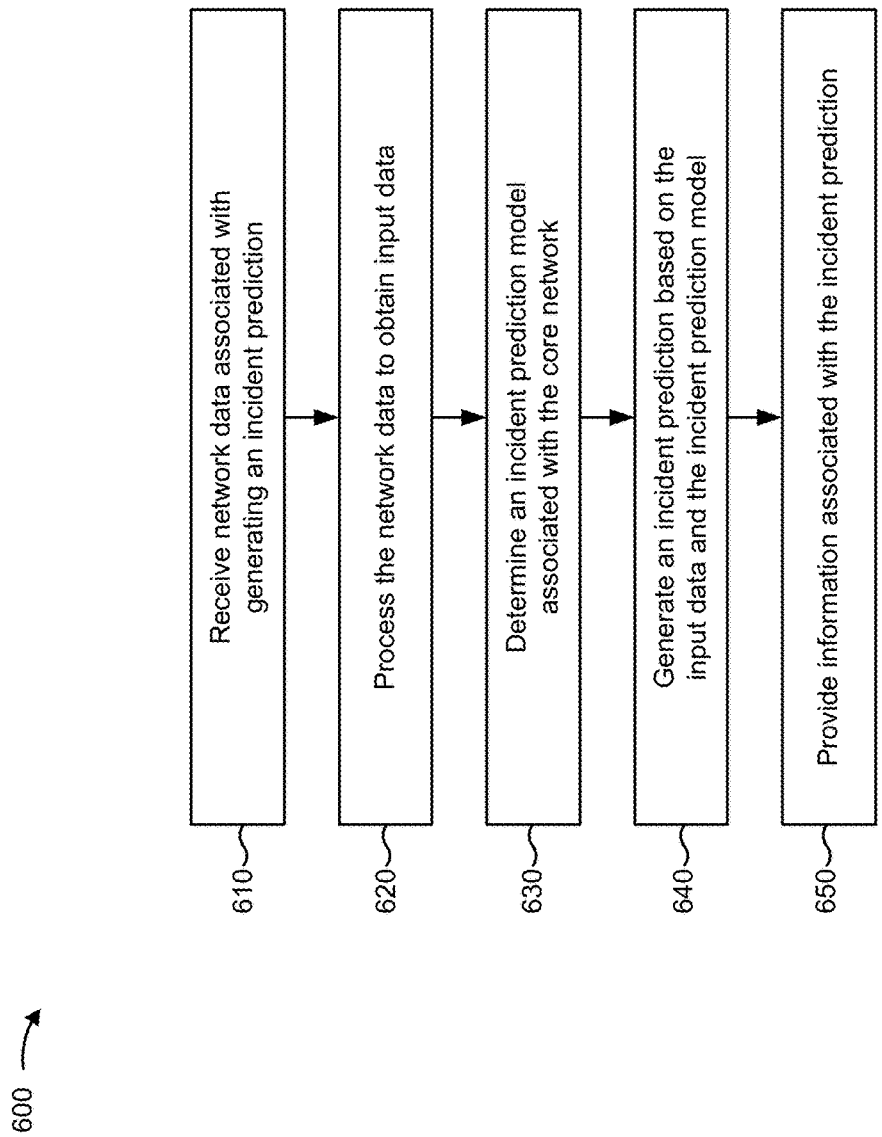
FIG. 6 is a flow chart of an example process for generating an incident prediction, associated with a core network, using an incident prediction model.

FIG. 6 is a flow chart of an example process 600 for generating an incident prediction, associated with a core network, using an incident prediction model. In some implementations, one or more process blocks of FIG. 6 may be performed by analytics device 220. In some implementations, one or more process blocks of FIG. 6 may be performed by another device or a group of devices separate from or including analytics device 220, such as operator device 210 and/or management device 250.

As shown in FIG. 6, process 600 may include receiving network data associated with generating an incident prediction (block 610). For example, analytics device 220 may receive network data associated with generating an incident prediction. In some implementations, analytics device 220 may receive the network data when network devices 240 and/or management devices 250 provide the network data. Additionally, or alternatively, analytics device 220 may receive the network data when analytics device 220 requests the network data (e.g., in response to an indication that analytics device 220 is to generate the incident prediction).

In some implementations, the network data may include alarm data, incident data, maintenance data, equipment data, usage data, and/or resolution data similar to that described above. However, the network data to be used for generation of the incident prediction may correspond to a current time period, such as a 12 hour period immediately preceding the request for the incident prediction, a one day period immediately preceding the request for the incident prediction, or the like. In some implementations, the time period during which the network data was collected may be referred to as a second time period, where the second time period may (e.g., immediately) follow or come after the first time period associated with the historical network data. Moreover, in some implementations, the network data may be associated with one or more network devices 240 for which the incident prediction is to be generated.

In some implementations, analytics device 220 may receive the network data based on requesting the network data. For example, analytics device 220 may receive an indication to generate an incident prediction for a particular network device 240, and analytics device 220 may request the network data from the particular network device 240 and/or management device 250 associated with managing the particular network device 240. Here, the particular network device 240 and/or management device 250 may provide the network data (e.g., corresponding to the current time period) in response to the request.

As further shown in FIG. 6, process 600 may include processing the network data to obtain input data (block 620). For example, analytics device 220 may process the network data to obtain input data. In some implementations, analytics device 220 may process the network data after analytics device 220 receives the network data. Additionally, or alternatively, analytics device 220 may process the network data when analytics device 220 receives the indication to generate the incident prediction (e.g., when analytics device 220 receives the network data before analytics device 220 receives the indication to generate the incident prediction).

In some implementations, analytics device 220 may process the network data in a manner similar to the manner in which analytics device 220 processes historical network data, as described above. For example, analytics device 220 may cleanse the network data, integrate the network data, and/or derive one or more core network variables based on the network data, as described above. Here, a result of cleansing the network data, integrating the network data, and/or deriving the core network variables may be input data that may be used to generate the incident prediction.

As further shown in FIG. 6, process 600 may include determining an incident prediction model associated with the core network (block 630). For example, analytics device 220 may determine an incident prediction model associated with the core network 230. In some implementations, analytics device 220 may determine the incident prediction model after analytics device 220 processes the network data to obtain the input data. Additionally, or alternatively, analytics device 220 may determine the incident prediction model when analytics device 220 receives the indication to generate the incident prediction. In some implementations, analytics device 220 may determine the incident prediction model based on storing the incident prediction model, as described above.

In some implementations, analytics device 220 may select the incident prediction model from a group of incident prediction models. For example, analytics device 220 may store or have access to a group of models associated with core network 230, and analytics device 220 may select the incident prediction model from the group of incident prediction models when, for example, the selected incident prediction model is trained based on historical network data associated with network device 240 for which the incident prediction is to be generated.

As further shown in FIG. 6, process 600 may include generating an incident prediction based on the input data and the incident prediction model (block 640). For example, analytics device 220 may generate the incident prediction based on the input data and the incident prediction model. In some implementations, analytics device 220 may generate the incident prediction after analytics device 220 processes the network data to obtain the input data. Additionally, or alternatively, analytics device 220 may generate the incident prediction after analytics device 220 determines the incident prediction model.

In some implementations, analytics device 220 may generate the incident prediction by providing the input data as an input to the incident prediction model and receiving, as an output, the incident prediction. For example, assume that analytics device 220 receives a request to generate an incident prediction for network device 240. Here, analytics device 220 may process network data, associated with network device 240 and corresponding to a 24 hour time period immediately preceding the request, in order to obtain input data associated with network device 240. In this example, analytics device 220 may determine, based on one or more predictor variables identified for use in the incident prediction model, the input data to be used as an input to the incident prediction model, may provide the input data as an input to the incident prediction model, and may receive, as an output, the incident prediction for network device 240.

In some implementations, as described above, the incident prediction may include a prediction (e.g., a probability, a binary output, a yes-no output, a prediction score, etc.) as to whether network device 240 will experience an incident during a future time window (e.g., a next 12 hours, a next 24 hours, a next two days, etc.). In some implementations, the future time window associated with the incident prediction may be referred to as a third time period, where the third time period may (e.g., immediately) follow or come at another time after the second time period associated with the network data. Additionally, or alternatively, the incident prediction may include information that identifies a predicted incident type of an incident that network device 240 may experience (e.g., a decreased throughput, a service outage, etc.). Additionally, or alternatively, the incident prediction may include another type of information, such as a predicted time at which the incident will occur.

As further shown in FIG. 6, process 600 may include providing information associated with the incident prediction (block 650). For example, analytics device 220 may provide information associated with the incident prediction. In some implementations, analytics device 220 may provide the information associated with the incident prediction after analytics device 220 generates the incident prediction. In some implementations, analytics device 220 may provide the information associated with the incident prediction to another device, such as operator device 210, network device 240, and/or management device 250.

In some implementations, analytics device 220 may provide the information associated with the incident prediction to cause an action to be performed based on the incident prediction. For example, if the incident prediction predicts that network device 240 will experience an incident, analytics device 220 may provide the information associated with the incident prediction to cause a proactive remedial action to be taken in order to prevent the incident. As an example, analytics device 220 may provide the information associated with the incident prediction to management device 250 such that management device 250 may generate a predictive ticket, to be provided to a technician, that identifies an action associated with preventing the incident, such as reconfiguring network device 240 (e.g., increasing virtual memory of network device 240, shortening a TCP connection timeout associated with network device 240, etc.), repairing network device 240 (e.g., cleaning a virus from network device 240, adding physical memory to network device 240, clearing a log file of network device 240, clearing a cache of network device 240, clearing an open network connection, etc.), or the like. In some implementations, such a predictive ticket may be automatically generated. Additionally, or alternatively, a user (e.g., of management device 250, of operator device 210, etc.) may manually generate the ticket based on the information associated with the incident prediction.

As others example, analytics device 220 may provide the information associated with the incident prediction to cause another type of action to be performed, such as a root cause analysis of a cause of the incident, a shut-down of core network 230 or a portion of core network 230, a denial of access to network device 240 for which the incident is predicted, a prevention of network device 240 from communicating via core network 230, a powering-on of one or more other network devices 240 (e.g., for load balancing purposes), a powering-off of network device 240, a route change associated with data processed by network device 240, a reallocation of bandwidth allocated to network device 240, or the like.

In some implementations, analytics device 220 may cause an action to be automatically (e.g., without user intervention) performed based on providing the information associated with the incident prediction. For example, analytics device 220 may provide the information associated with the incident prediction to network device 240 and/or one or more other network devices 240 to cause network device 240 and/or the other network devices 240 to automatically perform an action, such as a reconfiguration, a restart, a powering-off, a rerouting of traffic, or the like. In this way, the predicted incident may be avoided without user intervention, thereby reducing an amount of resources (e.g., personnel, time, money) need to manage core network 230.

Alternatively, if the incident prediction indicates that network device 240 will not experience an incident, then analytics device 220 may provide information associated with the incident prediction in order to notify a user and/or another device that no action needs to be taken with regard to network device 240.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
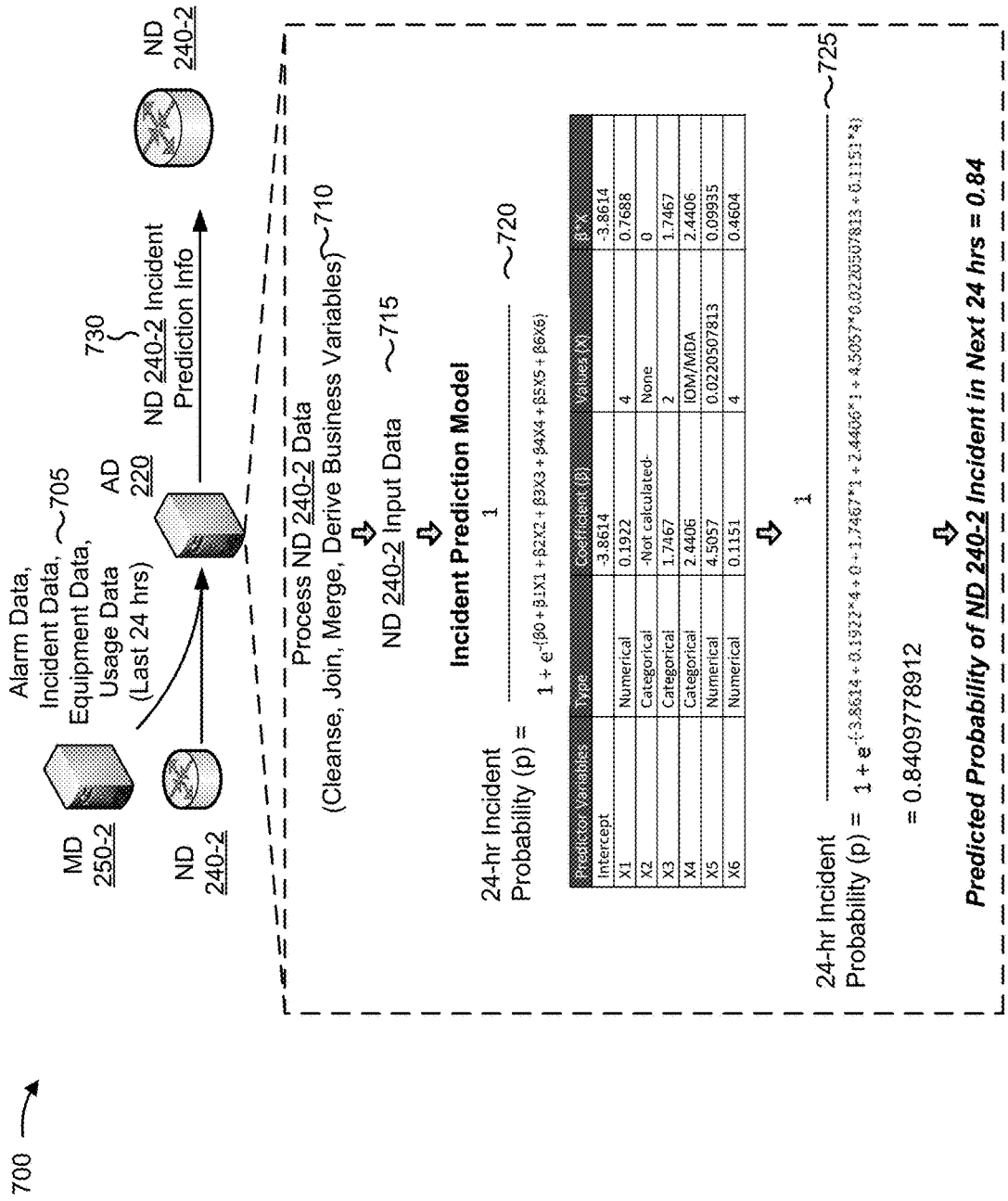
FIG. 7 is a diagram of an example implementation relating to the example process shown in FIG. 6.

FIG. 7 is a diagram of an example implementation 700 relating to example process 600 shown in FIG. 6. For the purposes of example implementation 700, assume that analytics device 220 stores an incident prediction model as described above with regard to example implementation 500. Further, assume that analytics device 220 receives an indication to generate an incident prediction for a particular network device 240 of core network 230, identified as network device 240-2.

As shown in FIG. 7, and by reference number 705, network device 240-2 and management device 250-2 (e.g., associated with managing network device 240-2) may, based on a request from analytics device 220, provide network data corresponding to period of time immediately preceding the time of the request to generate the incident prediction (e.g., a 24 hour time window). As shown by reference number 710, analytics device 220 may process (e.g., cleanse, join, merge, derive core network variables, etc.) network data of network device 240-2 and, as shown by reference number 715, may obtain input data based on processing the network data of network device 240-2.

As shown by reference number 720, analytics device 220 may determine the incident prediction model (e.g., based on the incident prediction model stored by analytics device 220). As shown by reference number 725, analytics device 220 may provide, as input to the incident prediction model, input data corresponding to the predictor variables associated with the incident prediction model. As shown, analytics device 220 may receive, as an output of the incident prediction model, a probability that network device 240-2 will experience an incident within the next 24 hours (e.g., 24-hr Incident Probability (p)=0.8409778912). As shown by reference number 730, analytics device 220 may then provide information associated with the incident prediction to network device 240-2 in order to cause network device 240-2 to automatically (e.g., without user intervention) perform proactive remedial action in order to prevent network device 240-2 from experiencing the incident. For example, network device 240-2 may, based on the information associated with the incident prediction, reconfigure network device 240-2 in a manner such that network device 240-2 may avoid the predicted incident.

As indicated above, FIG. 7 is provided merely as an example. Other examples are possible and may differ from what was described with regard to FIG. 7.

Implementations describe herein may allow an analytics device, associated with a core network, to process and analyze historical network data, associated with the core network, to create an incident prediction model associated with the core network. The analytics device may then generate, using the incident prediction model and additional network data, an incident prediction that predicts whether a future incident will occur within the core network. This may allow proactive remedial actions to be automatically performed on and/or by network devices of the core network in order to prevent incidents within the core network. This may also allow a core network operator to perform a proactive remedial action before the incident occurs, thus preventing a potential failure associated with the core network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   determining, by a device, first network data corresponding to a first time period,
   the first network data including information associated with alarms detected by a set of network devices, included in a core network, during the first time period, and
   the first network data including information associated with incidents experienced by the set of network devices during the first time period;
   creating, by the device and based on the first network data, rules for an incident prediction model associated with the core network;
   receiving, by the device, second network data, associated with the core network, corresponding to a second time period,
   the second network data including information associated with alarms detected by at least one network device, of the set of network devices, during the second time period,
   the second network data including information associated with incidents experienced by the at least one network device during the second time period, and
   the second time period being a time period after the first time period;
   generating, by the device and based on the second network data and the incident prediction model, an incident prediction that includes a prediction whether the at least one network device will experience an incident during a third time period;
   providing, by the device, information associated with the incident prediction to cause an action to be performed in the core network; and
   causing, by the device and based on providing the information, actions to be automatically performed,
   the actions including:
     a denial of access to the at least one network device,
     a prevention of the at least one network device from communicating via the core network, and
     a powering-on of one or more other network devices.

2. The method of claim 1, further comprising:
   deriving a set of variables based on the first network data;
   identifying, as a predictor variable, at least one variable of the set of variables; and
   where creating the rules for the incident prediction model comprises:
     creating the rules for the incident prediction model based on the identified predictor variable.

3. The method of claim 1, where generating the incident prediction comprises:
   processing the second network data to obtain input data,
     the input data including data corresponding to a predictor variable associated with the incident prediction model;
   providing the input data, corresponding to the predictor variable, as an input to the incident prediction model; and
   receiving the incident prediction as an output from incident prediction model.

4. The method of claim 1, where providing the information associated with the incident prediction comprises:

providing the information associated with the incident prediction to cause a predictive ticket, associated with preventing a predicted incident, to be generated.

5. The method of claim 1, where the first network data further includes at least one of:
   equipment data associated with the set of network devices;
   maintenance data associated with the set of network devices;
   usage data associated with the set of network devices; or
   resolution data associated with the set of network devices.

6. The method of claim 1, further comprising:
   cleansing the first network data or integrating the first network data; and
   where creating the rules for the incident prediction model comprises:
      creating the rules for the incident prediction model based on the cleansed first network data or the integrated first network data.

7. The method of claim 1, where the third time period is a time period that is less than or equal to approximately twenty-four hours.

8. A computer-readable medium storing instructions, the instructions comprising:
   one or more instructions that, when executed by one or more processors, cause the one or more processors to:
      determine historical network data associated with a network,
         the historical network data including information associated with alarms detected by a set of network devices, included in the network, during a first time period, and
         the historical network data including information associated with incidents experienced by the set of network devices during the first time period;
      train, based on the historical network data, an incident prediction model associated with the network;
      determine current network data, associated with the network,
         the current network data including information associated with alarms detected by a network device, of the set of network devices, during a second time period that follows the first time period, and
         the current network data including information associated with incidents experienced by the network device during the second time period;
      generate, based on the current network data and the incident prediction model, an incident prediction,
         the incident prediction including a prediction whether the network device will experience an incident during a future time period;
      provide information associated with the incident prediction; and
      cause, based on providing the information, actions to be automatically performed,
         the actions including:
            a denial of access to the network device,
            a prevention of the network device from communicating via the network, and
            a powering-on of one or more other network devices.

9. The computer-readable medium of claim 8, where the one or more instructions, when executed by the one or more processors, further cause the one or more processors to:
   derive a set of variables based on the historical network data; and
   identify at least one variable, of the set of variables, as a predictor variable; and
   where the one or more instructions, that cause the one or more processors to train the incident prediction model, cause the one or more processors to:
      train the incident prediction model based on the predictor variable.

10. The computer-readable medium of claim 8, where the one or more instructions, that cause the one or more processors to generate the incident prediction, cause the one or more processors to:
    process the current network data to obtain input data,
       the input data including data corresponding to a predictor variable associated with the incident prediction model;
    provide the input data, corresponding to the predictor variable, as an input to the incident prediction model; and
    receive the incident prediction as an output from incident prediction model.

11. The computer-readable medium of claim 8, where the one or more instructions, that cause the one or more processors to provide the information associated with the incident prediction, cause the one or more processors to:
    automatically generate a predictive ticket associated with preventing a predicted incident.

12. The computer-readable medium of claim 8, where the first historical network data further includes at least one of:
    equipment data associated with the set of network devices;
    maintenance data associated with the set of network devices;
    usage data associated with the set of network devices; or
    resolution data associated with the set of network devices.

13. The computer-readable medium of claim 8, where the one or more instructions, when executed by the one or more processors, further cause the one or more processors to:
    cleanse the historical network data or integrate the historical network data; and
    where the one or more instructions, that cause the one or more processors to train the incident prediction model, cause the one or more processors to:
       train the incident prediction model based on the cleansed historical network data or the integrated historical network data.

14. The computer-readable medium of claim 8, where the information associated with the incident prediction includes at least one of:
    a predicted incident type of a predicted incident; or
    a predicted time of the predicted incident.

15. A device comprising:
    one or more processors to:
       determine network data associated with a core network,
          the network data including information associated with alarms detected by a network device, of a set of network devices included in the core network, during a time period, and
          the network data including information associated with incidents experienced by the network device during the time period;
       select an incident prediction model, from a plurality of incident prediction models, associated with the core network;
       generate, based on the network data and the incident prediction model, an incident prediction, the incident prediction including a prediction of whether the network device will experience an incident during another time period,
the other time period being later than the time period; provide information associated with the incident prediction; and
cause, based on providing the information, actions to be automatically performed,
the actions including:
a denial of access to the network device,
a prevention of the network device from communicating via the core network, and
a powering-on of one or more other network devices.

16. The device of claim 15, where the one or more processors are further to:
determine historical network data associated with the core network,
the historical network data including information associated with alarms detected by the set of network devices during a historical time period,
the historical time period being the time period, and
the historical network data including information associated with incidents experienced by the set of network devices during the historical time period; and
create, based on the historical network data, rules for the incident prediction model associated with the core network.

17. The device of claim 15, where the one or more processors, when generating the incident prediction, are to:
process the network data to obtain input data,
the input data including data corresponding to a predictor variable associated with the incident prediction model;
provide the input data, corresponding to the predictor variable, as an input to the incident prediction model; and
receive the incident prediction as an output from incident prediction model.

18. The device of claim 15, where the one or more processors, when providing the information associated with the incident prediction, are to:
automatically generate a predictive ticket associated with preventing a predicted incident.

19. The device of claim 15, where the network data further includes at least one of:
equipment data associated with the network device;
maintenance data associated with the network device;
usage data associated with the network device; or
resolution data associated with the network device.

20. The device of claim 15, where the information associated with the incident prediction includes at least one of:
a predicted incident type of a predicted incident; or
a predicted time of the predicted incident.

* * * * *